US010186340B2

(12) United States Patent
Ikhlef

(10) Patent No.: US 10,186,340 B2
(45) Date of Patent: Jan. 22, 2019

(54) ANTI-SCATTER COLLIMATOR FOR HIGH SPEED ROTATION

(71) Applicant: FMI Medical Systems Co., Ltd., Zhejiang (CN)

(72) Inventor: Abdelaziz Ikhlef, Hudson, OH (US)

(73) Assignee: FMI Medical Systems Co., Ltd., Zhejiang (CN)

( * ) Notice: Subject to any disclaimer, the term of this patent is extended or adjusted under 35 U.S.C. 154(b) by 214 days.

(21) Appl. No.: 15/003,539

(22) Filed: Jan. 21, 2016

(65) Prior Publication Data

US 2017/0213612 A1 Jul. 27, 2017

(51) Int. Cl.
*G21K 1/02* (2006.01)
*G01T 1/20* (2006.01)

(52) U.S. Cl.
CPC .......... *G21K 1/025* (2013.01); *G01T 1/2018* (2013.01)

(58) Field of Classification Search
CPC .................. G01T 1/2018; G21K 1/025
See application file for complete search history.

(56) References Cited

U.S. PATENT DOCUMENTS

| 5,644,614 | A | 7/1997 | Toth et al. |
| 6,134,301 | A | 10/2000 | Mruzek et al. |
| 6,137,857 | A | 10/2000 | Hoffman et al. |
| 6,173,039 | B1 | 1/2001 | Hampel et al. |
| 6,298,117 | B1 | 10/2001 | Hampel et al. |
| 7,418,082 | B2 | 8/2008 | Levene et al. |
| 2004/0057556 | A1* | 3/2004 | Luhta ............... G21K 1/025 378/205 |
| 2004/0234036 | A1* | 11/2004 | Klausz ............. G03B 42/02 378/154 |
| 2009/0003530 | A1* | 1/2009 | Van Vroonhoven ... G01N 23/04 378/154 |
| 2010/0264322 | A1* | 10/2010 | Levene ............. G01T 1/2018 250/367 |
| 2012/0087462 | A1 | 4/2012 | Ikhlef |
| 2013/0121475 | A1 | 5/2013 | Deych et al. |
| 2014/0355734 | A1 | 12/2014 | Ying |

* cited by examiner

*Primary Examiner* — Chih-Cheng Kao
(74) *Attorney, Agent, or Firm* — Fishman Stewart PLLC

(57) ABSTRACT

A CT detector includes a base substrate, a photodiode array having a plurality of pixels, and the photodiode array is attached to the base substrate. A scintillator array is coupled to the photodiode array and includes a plurality of pixels that correspond with those of the photodiode. An anti-scatter grid (ASG) includes a base sheet, a top sheet, and a plurality of anti-scatter plates attached to the base sheet and the top sheet. The plurality of anti-scatter plates includes a first set of plates having a first thickness and a first length, and a second set of two plates each having a second thickness that is less than the first thickness and a second length that is greater than the first length, the two plates positioned respectively at bookend positions of the base sheet and top sheet.

20 Claims, 4 Drawing Sheets

ANTI-SCATTER COLLIMATOR FOR HIGH SPEED ROTATION

TECHNICAL FIELD

This disclosure relates generally to diagnostic imaging and, more particularly, to an apparatus and method of fabricating an anti-scatter grid (ASG) in computed tomography (CT) having improved image quality.

BACKGROUND

Typically, in CT imaging systems, a rotatable gantry includes an x-ray tube, detector, data acquisition system (DAS), and other components that rotate about a patient that is positioned at the approximate rotational center of the gantry. X-rays emit from the x-ray tube, are attenuated by the patient, and are received at the detector. The detector typically includes a photodiode-scintillator array of pixelated elements that convert the attenuated x-rays into photons within the scintillator, and then to electrical signals within the photodiode. The electrical signals are digitized and then received within the DAS, processed, and the processed signals are transmitted via a slipring (from the rotational side to the stationary side) to a computer or data processor for image reconstruction, where an image is formed.

The gantry typically includes a pre-patient collimator that defines or shapes the x-ray beam emitted from the x-ray tube. X-rays passing through the patient can cause x-ray scatter to occur, which can cause image artifacts. Thus, x-ray detectors typically include an anti-scatter grid (ASG) for collimating x-rays received at the detector.

Imaging data may be obtained using x-rays that are generated at a single polychromatic energy. However, some systems may obtain multi-energy images that provide additional information for generating images.

In order to meet the very tight performance standards and generate high quality and artifact-free CT images, a detector typically provides a response that is linearly related to x-ray intensity. Such performance standards typically include a) stability of the detector over time and temperature, b) sensitivity to focal spot motion, and c) light output over lifetime of the detector, as a few examples. In a third generation CT scanner, the relative behavior of adjacent channels is important and typically has tight specifications from channel to channel in order to avoid ring artifacts. This is commonly referred to as channel-to-channel non-linearity variation or channel-to-local average. Also, the drift of a channel from its state of calibration to its state of imaging (of the patient) can cause image artifacts. This variation is generally interpreted as the variation of one pixel to its neighbor. The sources of variation may be due to different components of the image chain such as collimator plate displacement, diode pixel response, and scintillator pixel damage, as examples. Generally, if certain specifications are not met, the variation can cause ring artifacts, bands, or smudges in the images.

ASGs typically include a plurality of plates that are shared between modules, which may include an end plate that is shared between the two. That is, the ASG may extend over two or more modules. End plates shared may be positioned in a gap formed between edge pixels of each module. In this case and in this example, when the plates get deformed or displaced because of thermal drift or thermal gradient, or by G-loading, gains from the two exposed pixels may induce opposite drift. If the drift occurs between calibration and the image state, then ring artifacts or other types of artifacts can be created.

Thus, there is a need to reduce variation within a CT detector and improve the robustness of an ASG.

BRIEF DESCRIPTION

Embodiments are directed toward an apparatus and method of fabricating an anti-scatter grid (ASG) having improved image quality in computed tomography (CT).

A CT detector includes a base substrate, a photodiode array having a plurality of pixels, and the photodiode array is attached to the base substrate. A scintillator array is coupled to the photodiode array and includes a plurality of pixels that correspond with those of the photodiode. An anti-scatter grid (ASG) includes a base sheet, a top sheet, and a plurality of anti-scatter plates attached to the base sheet and the top sheet. The plurality of anti-scatter plates includes a first set of plates having a first thickness and a first length, and a second set of two plates each having a second thickness that is less than the first thickness and a second length that is greater than the first length, the two plates positioned respectively at bookend positions of the base sheet and top sheet.

A method of manufacturing a CT detector includes assembling a scintillator array and a photodiode array on a base substrate, and assembling an anti-scatter grid (ASG) array with steps that include adhering a first set of plates to a base sheet on their ends, the first set of plates having a first thickness and a first length, adhering a top sheet to other ends of the first set of plates, and adhering a second set of two plates to the base sheet and the top sheet at the ends of the top sheet and base sheet, the two plates having a second thickness that is less than the first thickness and a second length that is greater than the first length.

An anti-scatter grid (ASG) for a CT detector includes a base sheet, a top sheet, and a plurality of anti-scatter plates having an angle with respect to each other such that each is aimed approximately at a focal spot of an x-ray tube when positioned in a CT system, the plurality of anti-scatter plates attached to the base sheet and the top sheet, the plurality of anti-scatter plates having a spacing that corresponds with a pixelated scintillator and photodiode array. The plurality of anti-scatter plates includes a first set of plates having a first thickness and a first length, and a second set of two plates each having a second thickness that is less than the first thickness and a second length that is greater than the first length, the two plates positioned respectively at bookend positions of the base sheet and top sheet.

Various other features and advantages will be made apparent from the following detailed description and the drawings.

DETAILED DESCRIPTION

The operating environment of disclosed embodiments is described with respect to a sixteen-slice computed tomography (CT) system. Embodiments are described with respect to a "third generation" CT scanner, however it is contemplated that the disclosed embodiments are applicable to other imaging systems as well, and for CT systems having more or less than the illustrated sixteen-slice system.

Figure 1:
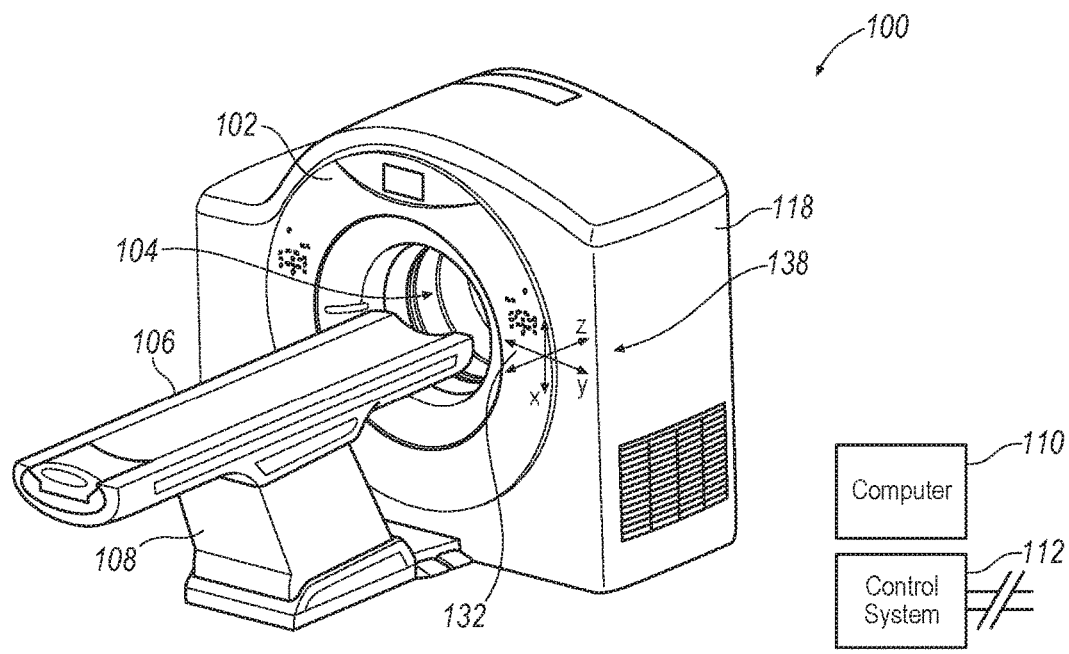
FIG. 1 is a perspective view of a CT imaging system.
Figure 2:
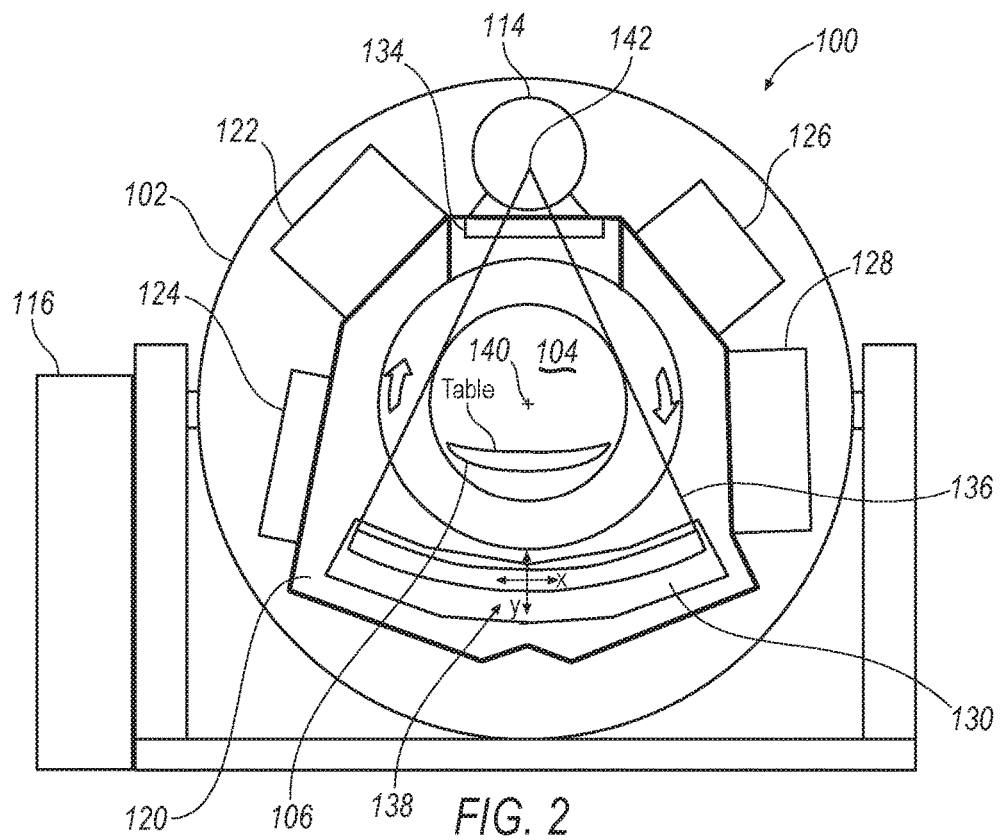
FIG. 2 is a planar cross-section of the system illustrated in FIG. 1.

Referring to FIGS. 1 and 2, a computed tomography (CT) system 100 includes a gantry 102 having an opening 104. A patient table 106 is positioned on a support structure 108, and patient table 106 is axially controllable such that a patient (not shown) positioned on table 106 may be positioned within opening 104. A computer system 110 provides operator instructions and other control instructions to a control system 112. Computer system 110 also may include image reconstruction algorithms, or an image reconstructor may be provided as a separate processing unit. Control system 112 provides control commands for operating gantry 102, an x-ray tube 114, a gantry motor controller 116, as examples. Gantry 102 includes a cover or enclosure 118, which provides for aesthetic improvement, safety, etc.

Gantry 102 includes a rotatable base 120, on which is mounted x-ray tube 114, a heat exchanger 122, a data acquisition system (DAS) 124, an inverter 126, a generator 128, and a detector assembly 130, as examples. System 100 is operated with commands entered by a user into computer 110. Gantry 102 may include gantry controls 132 located thereon, for convenient user operation of some of the commands for system 100. Detector assembly 130 includes a plurality of detector modules (not shown), which include an anti-scatter grid (ASG), scintillators, photodiodes, and the like, which detect x-rays and convert the x-rays to electrical signals, from which imaging data is generated. Gantry 102 includes a pre-patient collimator 134 that is positioned to define or shape an x-ray beam 136 emitted from x-ray tube 114. Although not shown, a shape filter may be positioned for instance between x-ray tube 114 and pre-patient collimator 134.

In operation, rotatable base 120 is caused to rotate about the patient up to typically a few Hz in rotational speed, and table 106 is caused to move the patient axially within opening 104. When a desired imaging location of the patient is proximate an axial location where x-ray beam 136 will be caused to emit, x-ray tube 114 is energized and x-ray beam 136 is generated from a focal spot within x-ray tube 114. The detectors receive x-rays, some of which have passed through the patient, yielding analog electrical signals are digitized and passed to DAS 124, and then to computer 110 where the data is further processed to generate an image. The imaging data may be stored on computer system 100 and images may be viewed. An X-Y-Z triad 138, corresponding to a local reference frame for components that rotate on rotatable base 120, defines a local directional coordinate systems in a gantry circumferential direction X, a gantry radial direction Y, and gantry axial direction Z. Accordingly, and referring to triad 138, the patient passes parallel to the Z-axis, the x-rays pass along the Y axis, and the rotational components (such as detector assembly 130) rotate in a circumferential direction and in the X direction, and about an isocenter 140 (which is a centerpoint about which rotatable base rotates, and is an approximate position of the patient for imaging purposes). A focal spot 142 is illustrated within x-ray tube 114, which corresponds to a spot from which x-ray beam 136 emits.

Figure 3:
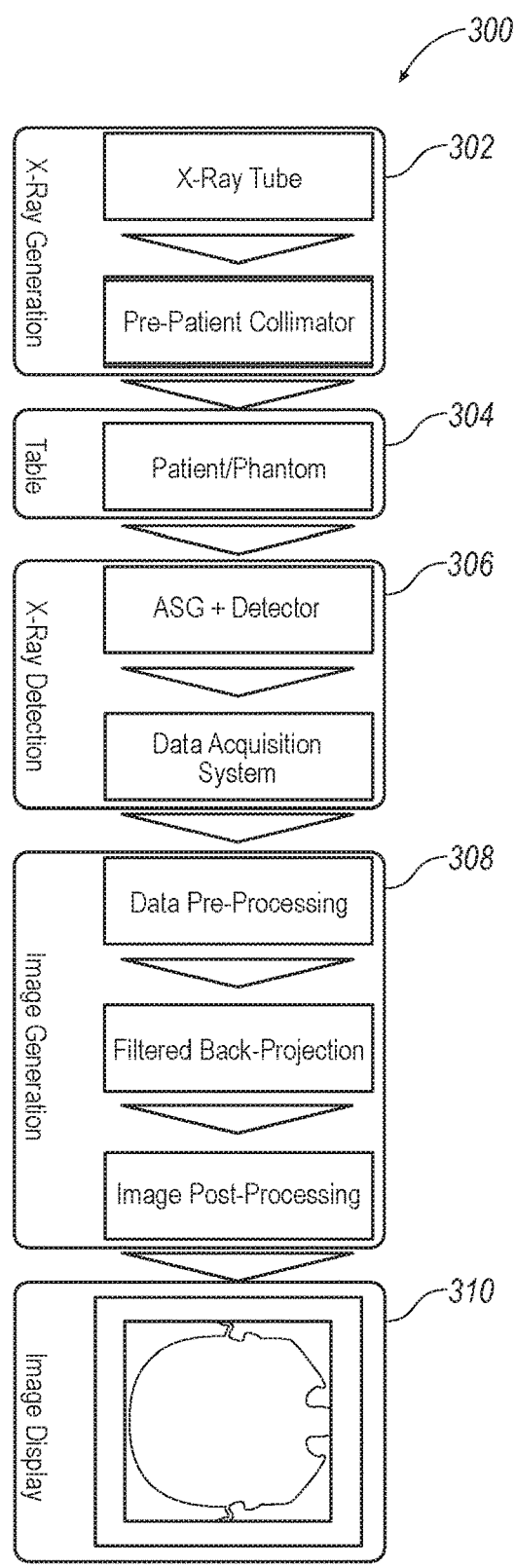
FIG. 3 is an example of an imaging chain.

FIG. 3 illustrates an exemplary image chain 300, consistent with the operation described with respect to FIGS. 1 and 2. X-ray generation 302 occurs, using x-ray tube 114 and passing x-rays through pre-patient collimator 134, during which time table 106 passes 304 through opening 104 of gantry 102. In one example table 106 may have a patient thereon, and in another example a phantom may be used for calibration purposes.

X-ray detection 306 occurs when x-rays having emitted from x-ray tube 114 pass to detector assembly 130. An anti-scatter grid (ASG) prevents x-ray scatter (emitting for example from the patient as secondary x-rays and in a direction that is oblique to x-ray beam 136), by generally passing x-rays that emit from x-ray tube 114. DAS 124 processes signals received from detector assembly 130. Image generation 308 occurs after the digitized signals are passed from a rotating side of gantry 102 (on rotatable base 120) to a stationary side, via for instance a slipring.

Image generation 308 occurs in computer system 110, or in a separate processing module that is in communication with computer system 110. The data is pre-processed, and image views or projections are used to reconstruct images using known techniques such as a filtered backprojection (FBP). Image post-processing also occurs, after which the images may be displayed 310, or otherwise made available for display elsewhere (such as in a remote computing device).

Figure 4:
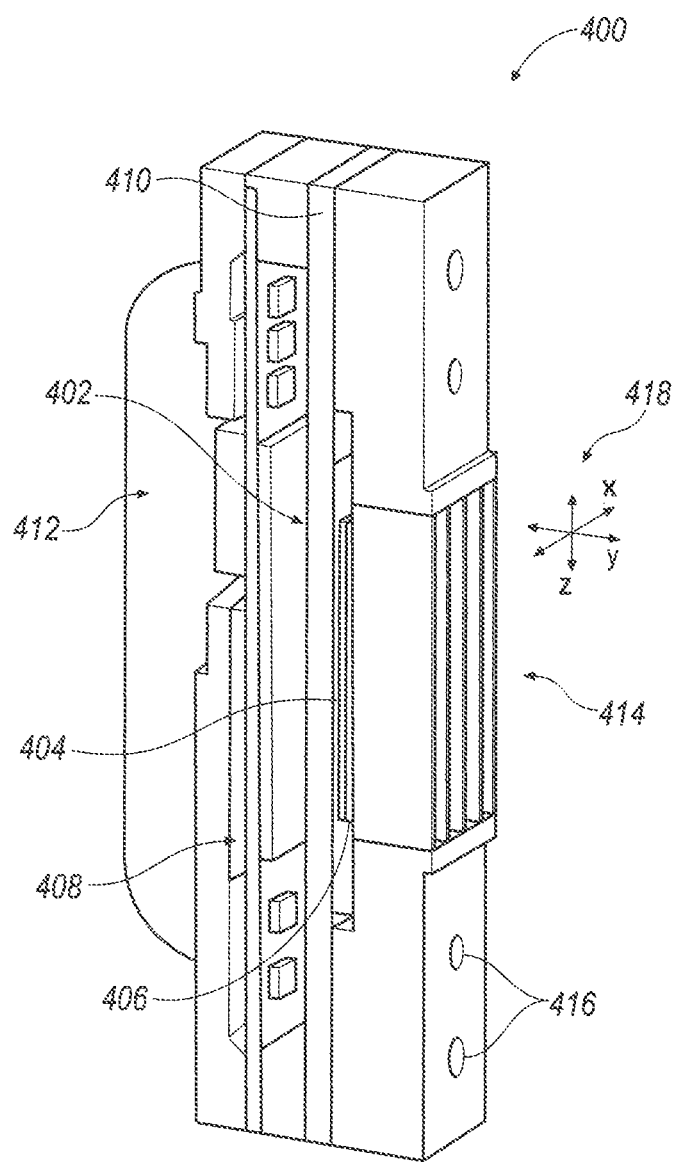
FIG. 4 is an example of a detector module.

FIG. 4 illustrates an exemplary detector module 400 that is one of a plurality of modules for use in detector assembly 130. A diode-scintillator array 402 includes a pixelated scintillator 404 positioned on a pixelated photodiode array 406. The photodiode array 402 may be either a front-lit or a back-lit type of photodiode. The diode-scintillator array 402 is positioned on an A/D board 408 that includes electronics components for signal processing, wherein analog electrical signals from diode-scintillator array 402 are digitized and then passed to DAS 124. Diode-scintillator array 402 is positioned on a base substrate 410 that may include a ceramic or other solid base material. A heat sink 412 is in thermal contact with A/D board 408 for providing enhanced cooling to the electronics located on A/D board 408. Detector module 400 also includes an anti-scatter grid (ASG) 414 that, in one embodiment, includes a plurality of plates (a few exemplary plates are shown) that are approximately parallel with a Y-Z plane of detector assembly 130. ASG 414, in the illustrated example, includes mount holes 416 which may be used for mounting module 400 to detector assembly 130 and aligning it therewith. FIG. 4 illustrates a triad 418 that illustrates corresponding X-Y-Z coordinates, as illustrated also in FIG. 1.

Figure 5:
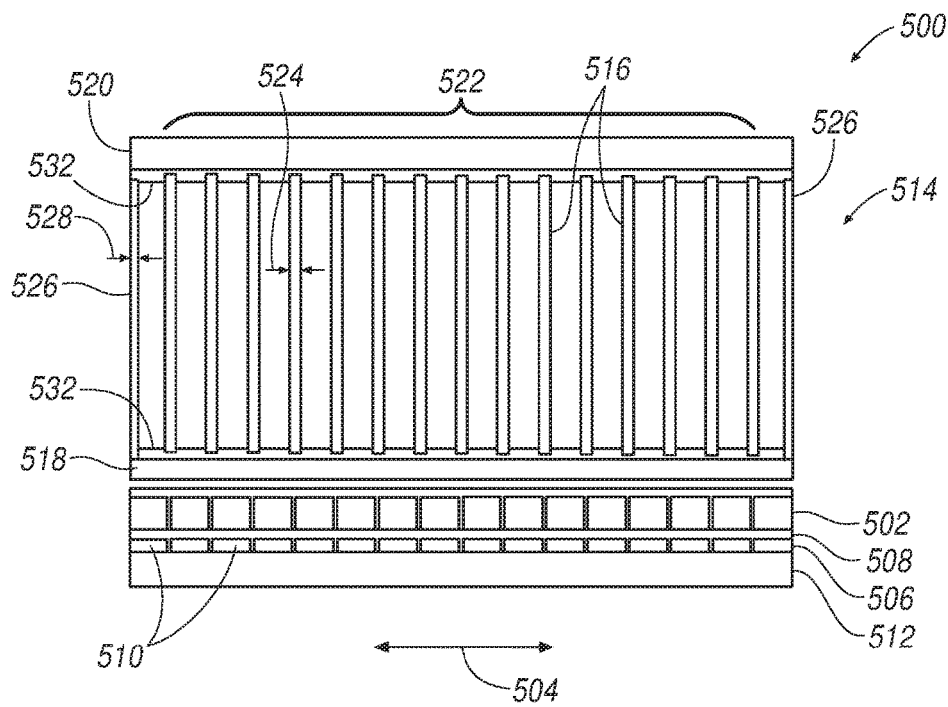
FIG. 5 illustrates an end view of a portion of a detector module according to an exemplary embodiment.

FIG. 5 illustrates an end view of a portion of a CT detector or detector module 500, according to one exemplary embodiment. Module 500 includes a scintillator array 502 that includes pixels 1-16 as marked. Pixels 1-16 extend in an x-direction 504, which corresponds with triad 134 of FIG. 1, and triad 418 of FIG. 4. As described with respect to detector module 400, detector module 500 also includes a photodiode array 506 having a plurality of pixels, and the array 506 is optically coupled via an optical coupler 508 to scintillator array 502. Photodiode array 506 includes an array of photodiode pixels 510 that correspond with pixels 1-16 of scintillator array 502. Module 500 also includes a base substrate 512, corresponding with base substrate 410 of FIG. 3. It is also contemplated that, although additional elements are not illustrated, module 500 includes additional elements that include but are not limited to an A/D board, a heat sink, and the like, as described with respect to FIG. 4.

Detector module 500 includes an ASG 514 that includes a plurality of anti-scatter plates 516. Plates 516 are attached to a base sheet 518 and a top sheet 520. The plurality of anti-scatter plates 516 includes a first set 522 of plates 516 having a first thickness 524 and a second set 526 of two plates each having a second thickness 528, 530 that is less than the first thickness 524. The two plates 526 are positioned respectively at bookend positions of the base sheet 518 and top sheet 520, which may be shared between modules. Thus, end plates shared may be positioned in a gap formed between edge pixels of each module.

In one example, each of the first set 522 of plates 516 is the same thickness, however it is contemplated that plates 516 of the first set 522 may vary in thickness. In another example each of the second set 526 of two plates at the bookend positions may have the same thickness for second thickness 528, 530, each of the second set 526 may have different thicknesses. In still another example, the second thickness of either or both plates 528, 530 is less than or equal to half of the first thickness 524. In such fashion, module 500 may be positioned within an array of modules, such as in detector assembly 130 of FIG. 2, such that a combined thickness of plates at the bookend positions are next to each other and such that their combined thickness may be comparable or less than that of one of the plates within first set 522 of plates 516. Image quality is not compromised at a boundary between modules due to an abrupt change in thickness of the combined plates, in comparison to the thickness of plates within the first set 522. Thus, in general, plates in the second set 526 include thicknesses that are less than of half that of the first set 522 of plates 516.

Each of the plurality of anti-scatter plates 216 is positioned having an angle with respect to each other such that each is aimed approximately at a focal spot of an x-ray tube when positioned in a CT system. That is, referring back to FIG. 1, x-ray beam 136 emits from focal spot 142 of x-ray tube 114, and plates within detector assembly 130 are approximately aimed toward focal spot 142 to provide absorption for scatter x-rays. However, referring to FIG. 5, given the scale of the plates 516 relative to system 100, the angles between plates are small and not readily visible in FIG. 5, but present nevertheless. Each of the anti-scatter plates 516 is comprised, as examples, of one of tungsten, molybdenum, tantalum, and an alloy of one of tungsten, molybdenum, tantalum.

At least one of the base sheet 518 and the top sheet 520 is a material that is essentially transparent to x-rays. In one example the transparency refers to x-rays having an energy that is greater than 20 kV. In such fashion, very little or no attenuation of note occurs, such that x-rays desirable for imaging purposes pass through to scintillator array 502. Exemplary materials for base sheet 518 and top sheet 520 include but are not limited to carbon graphite, aluminum, and a polymer. Exemplary thicknesses are 100 or more microns up to a few hundred microns in thickness. An adhesive 532, such as a radiation-hard epoxy, may be used to adhere plates 516 to the top sheet 520 and base sheet 518, to maintain position of plates 516 in operation.

Figure 6:
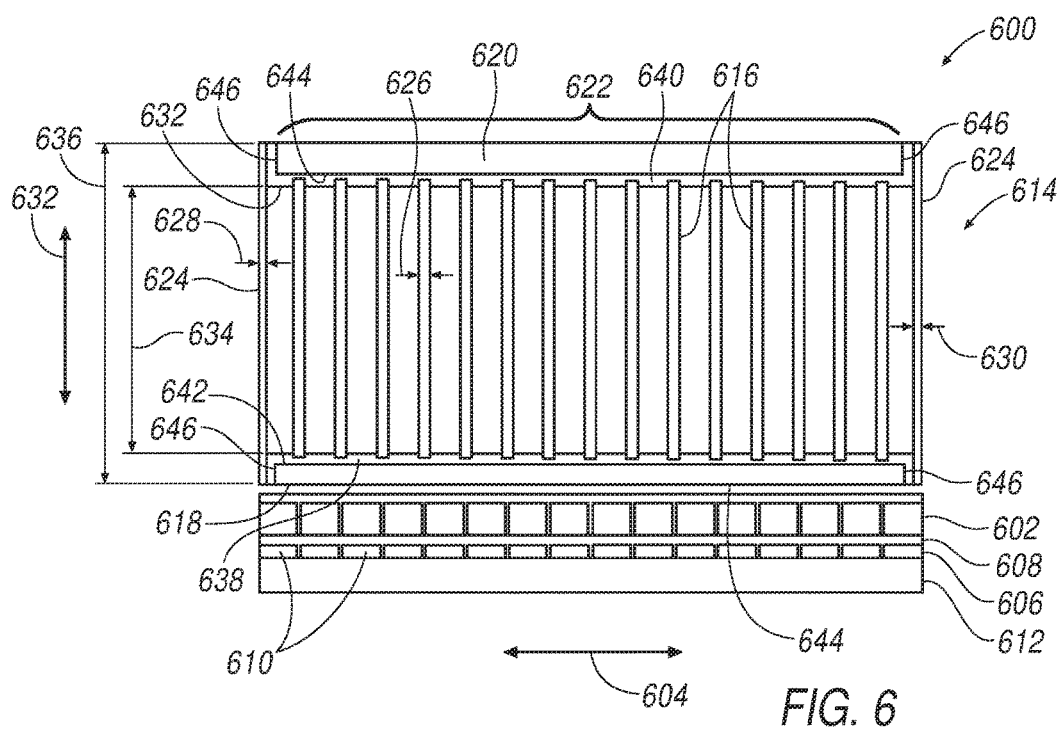
FIG. 6 illustrates an end view of a portion of detector module according to another exemplary embodiment.

FIG. 6 illustrates an end view of a portion of a CT detector or detector module 600, according to another exemplary embodiment. Module 600 includes a scintillator array 602 that includes pixels 1-16 that extend in an x-direction 604. Detector module 600 also includes a photodiode array 606 having a plurality of pixels, and the array 606 is optically coupled via an optical coupler 608 to scintillator array 602. Photodiode array 606 includes an array of photodiode pixels 610 that correspond with pixels 1-16 of scintillator array 602. Module 600 also includes a base substrate 612.

Detector module 600 includes the general aspects of module 500 of FIG. 5, to include an ASG 614 having a plurality of anti-scatter plates 616. Plates 616 are attached to a base sheet 618 and a top sheet 620. As with detector module 500, ASG 614 includes a first set 622 of anti-scatter plates 616 and a second set of two plates 624 at bookend positions of the array of anti-scatter plates 616 and of the base sheet 618 and the top sheet 620. Further, the description of module 500 regarding plate positioning, thickness, and angular orientation, and materials of the various components of module 600, are generally applicable to detector module 600, as well.

The first set 622 of plates 616 includes a first thickness 626 and second set 624 of two plates each has a second thickness 628, 630 that is less than the first thickness 626. The two plates 624 are positioned respectively at bookend positions of the base sheet 618 and top sheet 620. In this exemplary embodiment, first set 622 of plates 616 and the two plates 624 have lengths that differ from one another. Length of the plates 616 is defined along a y-direction 632, which corresponds with triad 138 of FIG. 1. Plates 624 in this example are longer than that of the first set 622. That is, first set 622 includes a first plate length 634, and plates 624 have a second length 636. In one example, first plate length 634 is between 5 and 30 mm. In such fashion, plates 624 have an increased surface area for improved adhesion thereof to each of the base sheet 618 and the top sheet 620, compared to the embodiment of FIG. 5.

In order to accommodate the added length of plates 624 compared to plates 526 of FIG. 5, base sheet 618 and top sheet 620 themselves have a shorter length than base sheet 518 and top sheet 520 of FIG. 5. Accordingly, a first adhesive material 638 adheres a first end of the first set 622 of plates to the base sheet 618, and a second adhesive material 640 adheres a second end of the first set 622 of plates to the top sheet 620. Each of the base sheet 618 and top sheet 620 includes a respective top surface 642 and bottom surface 644. Each of the base sheet 618 and top sheet 620 includes respective end surfaces 646 that are approximately orthogonal to top surfaces 642 and bottom surfaces 644. And, according to the disclosed embodiment, each end of the two plates 626 is adhered to a respective end surface 646 of the base sheet 618 and the top sheet 620.

Accordingly, the disclosed embodiment of FIG. 6 reduces the displacement of the collimator plates 616 with respect to edges of the scintillation array 602 by re-enforcing a locking mechanism (i.e., the adhesive) over a surface on the edges at surfaces 646. For this purpose the collimator (ASG) plates at the ends are made taller than those in the middle in order to provide more volume and surface area for the adhesive. This disclosure therefore locks the end plates by providing more area for adhesive and more volume for adhesive to be used.

Advantages that will result from this disclosure include: elimination of gain variation from one calibration state to imaging state (temperature) over an extended time; reduction of deflection of end plates due to G-load for different speeds of rotation; image quality (IQ) improvement for a wide range of room temperature; improvement of adhesive application processes at the supplier (i.e., simplified assembly with larger adhesion surfaces).

Other impacts of this disclosure on products such a CT scanner include: high relaxation in plate position accuracy to reflector septa, which may lead to higher manufacturability capability and reduce time for testing; cost improvement by reducing the scrap of anti-scatter grid due to weakness in end plates; simplification of thermal control and management of the detector temperature; and improvement of room temperature range requirements which will be a great advantage to the end-use customer (air-condition requirements will be relaxed in imaging suites).

Thus, to improve the manufacturability and improve the adhesive process, thin plates of tungsten or molybdenum, as example, are used with half of the standard plate thickness (used in the middle of the module) at the edges or bookend locations of the scintillation array, with thicker plates used in the inner pixels. The end plates are made taller than the inner plates so that low Z-material sheet (i.e., can be inserted inside and provide more surface for the adhesive. The positions of the end plates will be biased inward to the shielding capability and provide additional gap between modules. The number of plates then becomes equal to m+1 where m is the number of channels in X-axis of the modules. In case of the n channels module, the ASG will have (n+1) plates where in the end plates are less than 50% of the inner plates.

A CT detector includes a base substrate, a photodiode array having a plurality of pixels, and the photodiode array is attached to the base substrate. A scintillator array is coupled to the photodiode array and includes a plurality of pixels that correspond with those of the photodiode. An anti-scatter grid (ASG) includes a base sheet, a top sheet, and a plurality of anti-scatter plates attached to the base sheet and the top sheet. The plurality of anti-scatter plates includes a first set of plates having a first thickness and a first length, and a second set of two plates each having a second thickness that is less than the first thickness and a second length that is greater than the first length, the two plates positioned respectively at bookend positions of the base sheet and top sheet.

A method of manufacturing a CT detector includes assembling a scintillator array and a photodiode array on a base substrate, and assembling an anti-scatter grid (ASG) array with steps that include adhering a first set of plates to a base sheet on their ends, the first set of plates having a first thickness and a first length, adhering a top sheet to other ends of the first set of plates, and adhering a second set of two plates to the base sheet and the top sheet at the ends of the top sheet and base sheet, the two plates having a second thickness that is less than the first thickness and a second length that is greater than the first length.

An anti-scatter grid (ASG) for a CT detector includes a base sheet, a top sheet, and a plurality of anti-scatter plates having an angle with respect to each other such that each is aimed approximately at a focal spot of an x-ray tube when positioned in a CT system, the plurality of anti-scatter plates attached to the base sheet and the top sheet, the plurality of anti-scatter plates having a spacing that corresponds with a pixelated scintillator and photodiode array. The plurality of anti-scatter plates includes a first set of plates having a first thickness and a first length, and a second set of two plates each having a second thickness that is less than the first thickness and a second length that is greater than the first length, the two plates positioned respectively at bookend positions of the base sheet and top sheet.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the preceding discussion is generally provided in the context of medical imaging, it should be appreciated that the present techniques are not limited to such medical contexts. The provision of examples and explanations in such a medical context is to facilitate explanation by providing instances of implementations and applications. The disclosed approaches may also be utilized in other contexts, such as the non-destructive inspection of manufactured parts or goods (i.e., quality control or quality review applications), and/or the non-invasive inspection or imaging techniques.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. A CT detector, comprising:
   a base substrate;
   a photodiode array having a plurality of pixels, the photodiode array attached to the base substrate;
   a scintillator array coupled to the photodiode array and having a plurality of pixels that correspond with those of the photodiode array, the scintillator array having a first width; and
   an anti-scatter grid (ASG), comprising:
      a base sheet having a second width that is less than the first width;
      a top sheet having a third width that is less than the first width; and
      a plurality of anti-scatter plates attached to the base sheet and the top sheet, the plurality of anti-scatter plates comprising:
         a first set of plates having a first thickness and a first length; and
         a second set of two plates each having a second thickness that is less than the first thickness and a second length that is greater than the first length, the two plates positioned respectively at bookend positions of the base sheet and top sheet such that the base sheet and the top sheet are positioned between two plates of the second set, providing surface areas for improved adhesion.

2. The CT detector of claim 1, comprising:
   a first adhesive material that adheres a first end of the first set of plates to the base sheet;
   a second adhesive material that adheres a second end of the first set of plates to the top sheet;
   wherein:
   each of the base sheet and top sheet includes a respective top and bottom surface and respective end surfaces; and
   each end of the two plates of the second set is adhered to a respective end surface of the base sheet and the top sheet.

3. The CT detector of claim 2, wherein the first adhesive is positioned between the base sheet and each of the two plates of the second set, and the second adhesive is positioned between the top sheet and each of the two plates.

4. The CT detector of claim 1, wherein each of the plurality of anti-scatter plates is positioned having an angle with respect to each other such that each is aimed approximately at a focal spot of an x-ray tube when positioned in a CT system.

5. The CT detector of claim 1, wherein each of the anti-scatter plates is comprised of one of tungsten, molybdenum, tantalum, and an alloy of one of tungsten, molybdenum, tantalum.

6. The CT detector of claim 1, wherein at least one of the base sheet and the top sheet is comprised of a material that is essentially transparent to x-rays greater than 20 kV.

7. The CT detector of claim 1, wherein at least one of the base sheet and the top sheet is comprised of one of carbon graphite, aluminum, and a polymer.

8. The CT detector of claim 1, wherein the second thickness is less than or equal to half the first thickness.

9. A method of manufacturing a CT detector, comprising:
assembling a scintillator array and a photodiode array on a base substrate, the scintillator array having a first width; and
assembling an anti-scatter grid (ASG) array with steps comprising:
adhering a first set of plates to a base sheet on ends of the plates of the first set, the first set of plates having a first thickness and a first length and the base sheet having a width that is less than the first width;
adhering a top sheet to other ends of the plates of the first set, the top sheet having a third width that is less than the first width; and
adhering a second set of two plates to the base sheet and the top sheet at the ends of the top sheet and base sheet such that the base sheet and the top sheet are positioned between the two plates of the second set, providing surface areas for improved adhesion between the base sheet and the two plates and between the top sheet and the two plates, the two plates having a second thickness that is less than the first thickness and a second length that is greater than the first length.

10. The method of claim 9, comprising:
adhering a first end of the first set of plates to the base sheet with a first adhesive;
adhering a second end of the first set of plates to the top sheet with a second adhesive; and
adhering each end of the two plates of the second set to a respective end of the base sheet and the top sheet.

11. The method of claim 10, wherein the first adhesive is positioned between the base sheet and each of the two plates of the second set, and the second adhesive is positioned between the top sheet and each of the two plates.

12. The method of claim 9, comprising positioning each of the plates of the first and second sets having an angle with respect to each other such that each is aimed approximately at a focal spot of an x-ray tube when positioned in a CT system.

13. The method of claim 12, wherein each of the anti-scatter plates is comprised of one of tungsten, molybdenum, tantalum, and an alloy of one of tungsten, molybdenum, tantalum.

14. The method of claim 9, wherein at least one of the base sheet and the top sheet is comprised of a material that is essentially transparent to x-rays greater than 20 kV.

15. The method of claim 9, wherein at least one of the base sheet and the top sheet is comprised of one of carbon graphite, aluminum, and a polymer.

16. The method of claim 9, wherein the second thickness is less than or equal to half the first thickness.

17. An anti-scatter grid (ASG) for a CT detector, comprising:
a base sheet;
a top sheet; and
a plurality of anti-scatter plates having an angle with respect to each other such that each is aimed approximately at a focal spot of an x-ray tube when positioned in a CT system, the plurality of anti-scatter plates attached to the base sheet and the top sheet, the plurality of anti-scatter plates having a spacing that corresponds with a pixelated scintillator and photodiode array, the pixelated scintillator having a first width, the base sheet having a second width that is less than the first width, and the top sheet having a third width that is less than the first width, the plurality of anti-scatter plates comprising:
a first set of plates having a first thickness and a first length; and
a second set of two plates each having a second thickness that is less than the first thickness and a second length that is greater than the first length, the two plates positioned respectively at bookend positions of the base sheet and top sheet such that the base sheet and the top sheet are positioned between the two plates of the second set, providing surface areas for improved adhesion.

18. The ASG of claim 17, comprising:
a first adhesive material that adheres a first end of the first set of plates to the base sheet;
a second adhesive material that adheres a second end of the first set of plates to the top sheet;
wherein each end of the two plates of the second set is adhered to a respective end of the base sheet and the top sheet.

19. The ASG of claim 18, wherein the first adhesive material is positioned between the base sheet and each of the two plates of the second set, and the second adhesive material is positioned between the top sheet and each of the two plates.

20. The ASG of claim 17, wherein each of the anti-scatter plates is comprised of one of tungsten, molybdenum, tantalum, and an alloy of one of tungsten, molybdenum, tantalum.

* * * * *